United States Patent [19]

Pippin

[11] Patent Number: 5,238,145
[45] Date of Patent: Aug. 24, 1993

[54] FLEXIBLE EJECTOR MECHANISM FOR A CARTRIDGE DISPENSER IN AN AUTOMATED ORDER SYSTEM

[75] Inventor: James M. Pippin, Keller, Tex.

[73] Assignee: ElectroCom Automation L.P., Arlington, Tex.

[21] Appl. No.: 759,545

[22] Filed: Sep. 13, 1991

[51] Int. Cl.$^5$ ............................................. B65G 59/00
[52] U.S. Cl. .................................... 221/260; 221/270
[58] Field of Search ............... 221/260, 267, 268, 270, 221/258

[56] References Cited

U.S. PATENT DOCUMENTS

| | | | |
|---|---|---|---|
| 3,712,510 | 1/1973 | Lindahl | 221/260 |
| 3,833,148 | 9/1974 | Honas | 221/260 X |
| 4,518,302 | 5/1985 | Knapp | 414/273 |
| 4,541,547 | 9/1985 | Miknyocki et al. | 221/260 |
| 4,792,057 | 12/1988 | Mizer et al. | 221/260 X |

Primary Examiner—David H. Bollinger
Attorney, Agent, or Firm—Harold E. Meier

[57] ABSTRACT

A flexible belt ejector mechanism for dispensing products from a product cartridge onto a conveyor in an automated order system (AOS). The flexible belt is disposed in an L-shaped guide track that is mounted adjacent to the cartridge with the ejector and dispenser oriented at a compound angle with respect to the underlying conveyor for efficient operation and resupply of the system. A pneumatic actuator is coupled to the belt to cause the belt to travel along the L-shaped track and eject the bottom-most product from the cartridge. The L-shape of the ejector minimizes the space required for the ejector mechanism enabling more product dispensers to be installed in the AOS over a given fixed conveyor length.

8 Claims, 6 Drawing Sheets

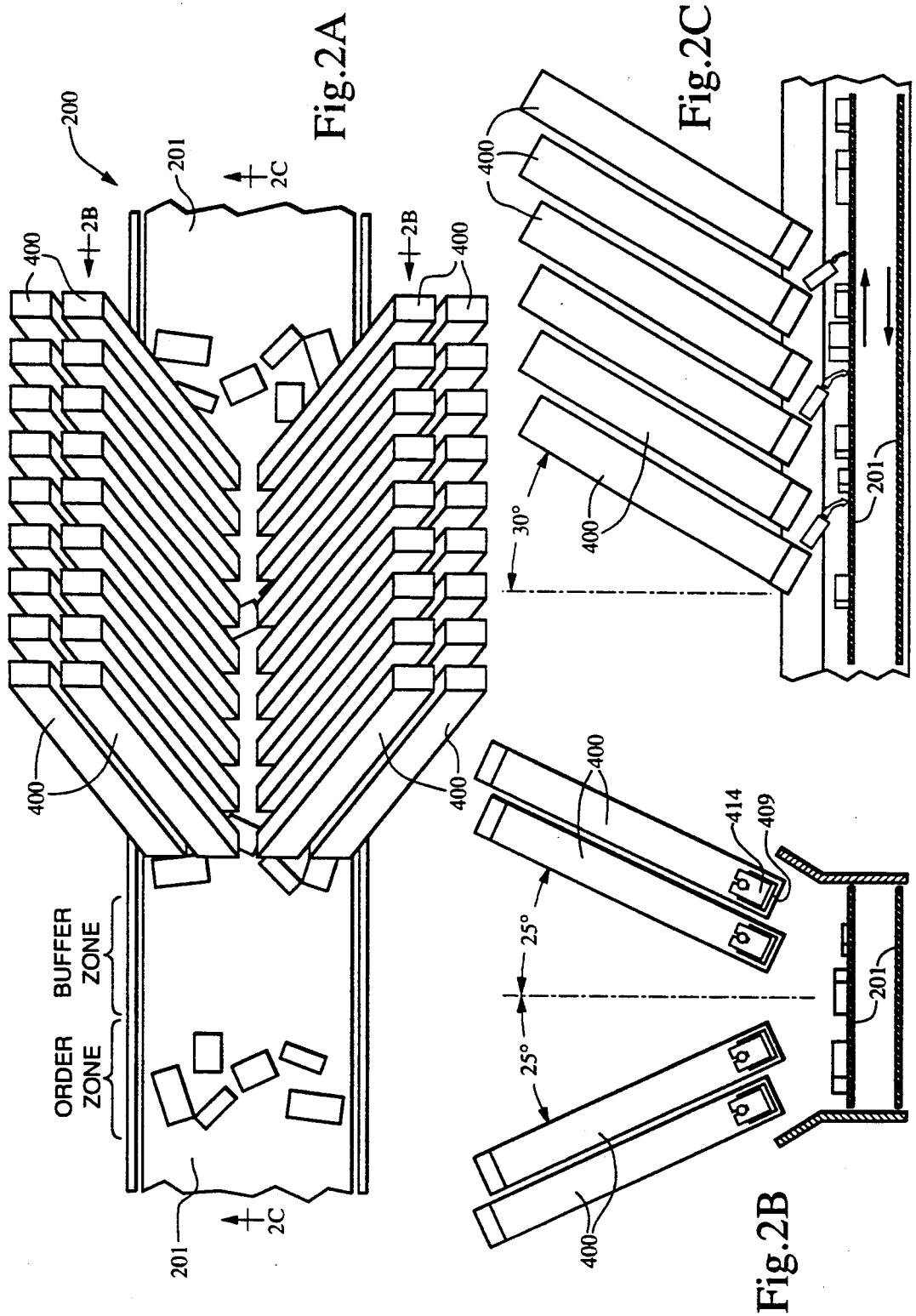

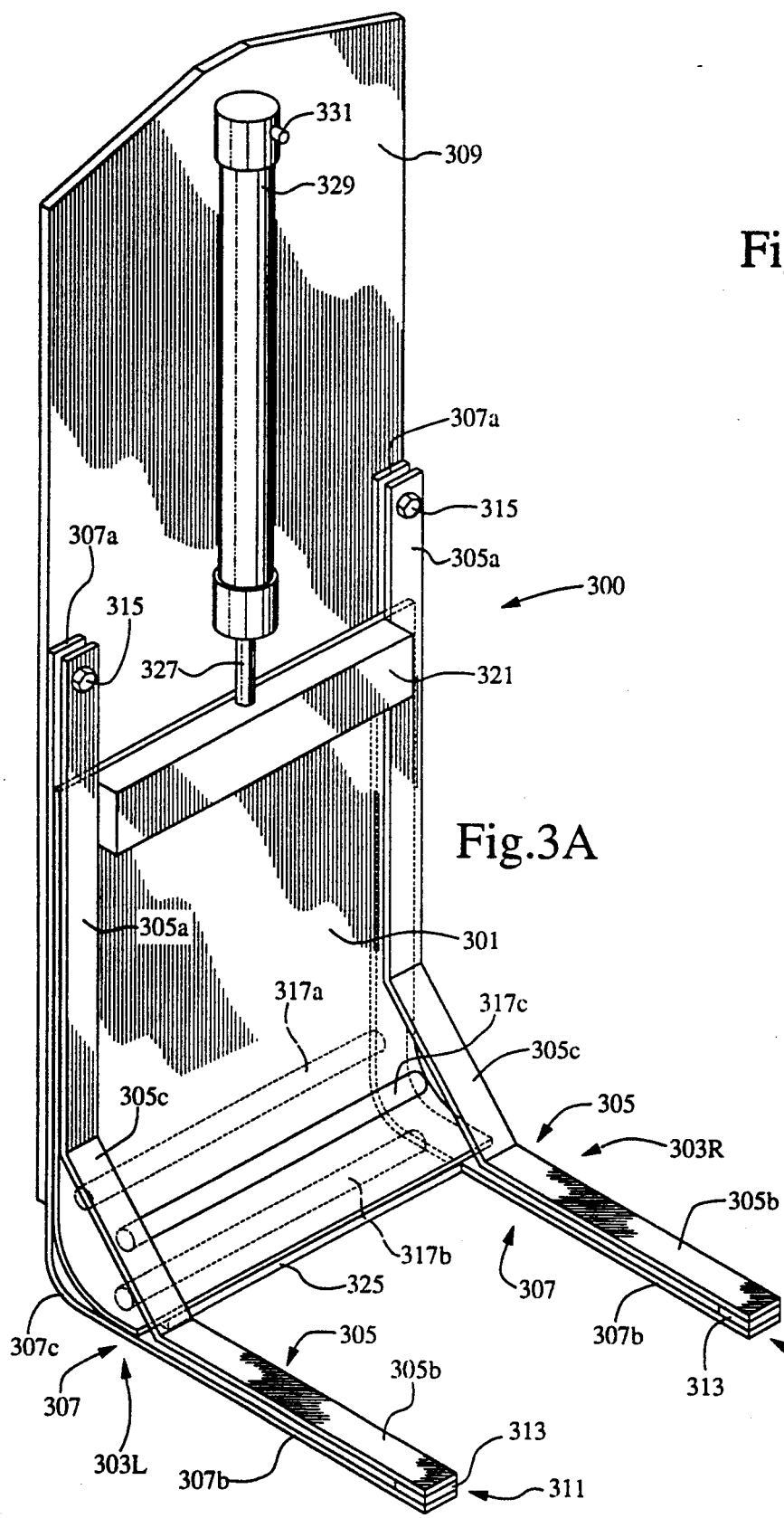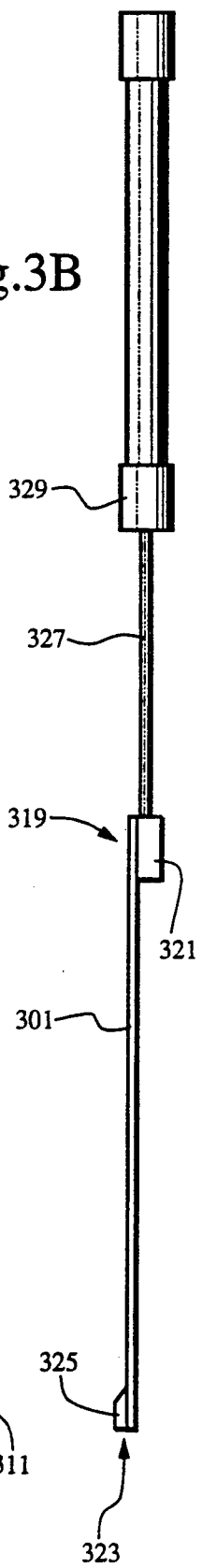
Fig.3A
Fig.3B

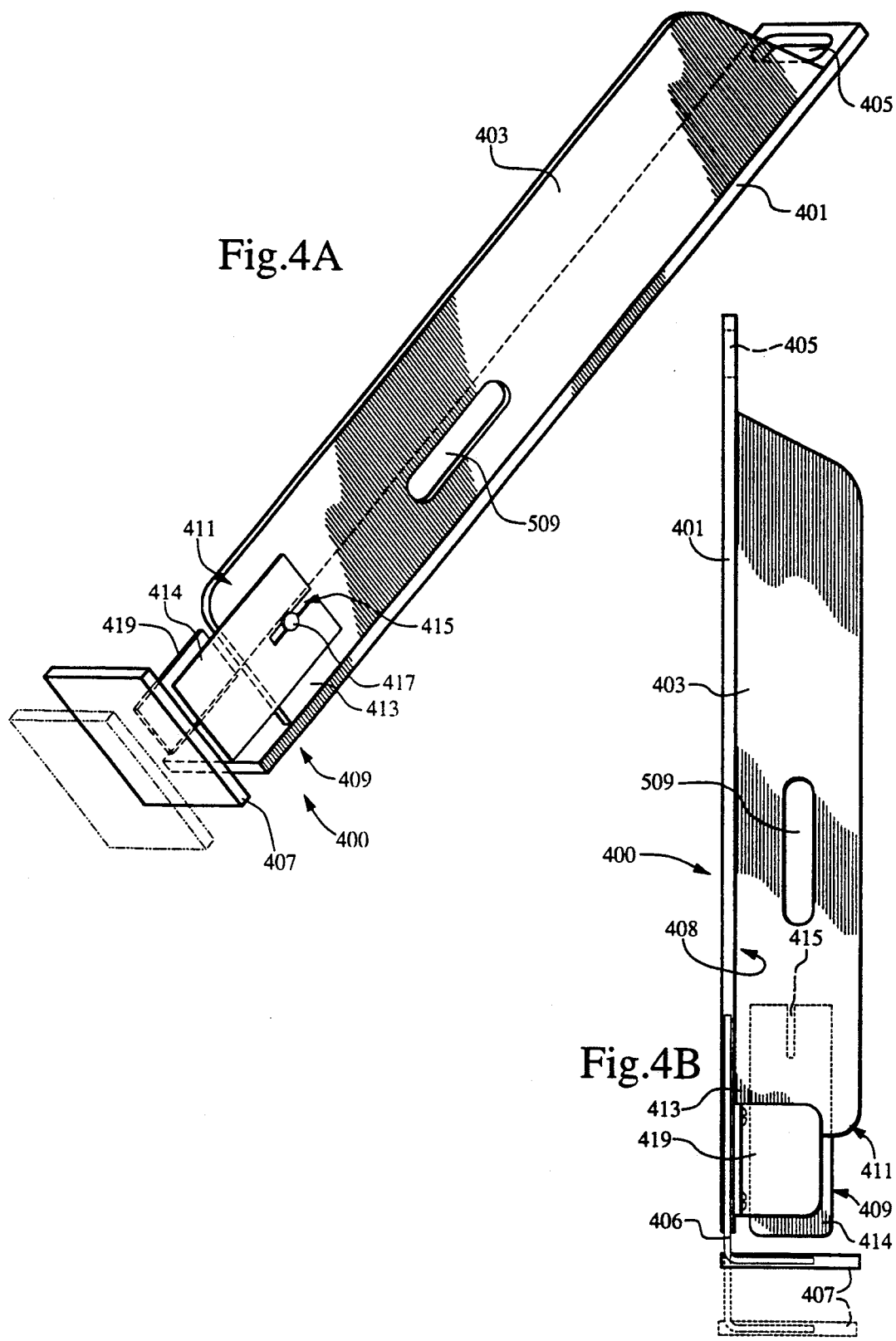

FLEXIBLE EJECTOR MECHANISM FOR A CARTRIDGE DISPENSER IN AN AUTOMATED ORDER SYSTEM

TECHNICAL FIELD

The present invention relates to automated order filling systems utilizing a plurality of cartridge product dispensers arrayed in a matrix configuration over a gathering conveyor belt, and in particular to an automated product order filling system utilizing a pneumatically actuated flexible ejector mechanism for ejecting products from the bottom of a product cartridge oriented at a compound angle with respect to the underlying conveyor.

BACKGROUND OF THE INVENTION

Product manufacturers often package a plurality of products, sometimes called a product lot, into cases for storage and subsequent shipping to distributors. The quantity of products in the case is often referred to as a case lot quantity. It is not at all unusual during product distribution for a manufacturer or a distributor to break open a case and distribute products in less than case lot quantities. Typically, these products are assembled with other products from other cases pursuant to a shipping order to satisfy individual customer demand.

Filling an order for multiple product types in less than case lot quantities requires that the manufacturer or distributor access the cases for each chosen product type, pick the required number of units of the product from each case, and assemble the picked products into a single container for shipment. This is commonly referred to as broken case order picking. Historically, this task has been manually performed by humans. Manual case picking, however, is a relatively slow process which has proven to be prone to picking errors. Such errors commonly occur when the human operator picks or pulls incorrect products or quantities from the cases to fill the order or forgets to pull a particular product as designated by the order.

Automation of the broken case picking task is the preferred solution to the inefficient and ineffective manual broken case order picking method. A number of automated picking systems, often referred to as automated ordering systems (AOS), are known in the art. In a typical prior art AOS, a terminal operator receives and inputs a product shipping order into the system host computer which typically handles accounting and inventory control functions for the distribution operation. When the order is ready to be executed, a central control computer for the AOS directs in real time the filling of the order by causing the correct products and quantities to be automatically picked and assembled from case lots to complete the order. With such an automated system, the number of incorrectly filled orders and the collateral costs associated with picking errors are minimized or eliminated.

A typical prior art AOS includes a plurality of individual product cartridges stocked with different type of products. The cartridges are arrayed in a matrix configuration along the length of an underlying gathering conveyor belt. Products ejected from the cartridges are collected by the gathering conveyor for transport downstream where the products are output and collected to complete an order according to the input shipping order. An example of a prior art matrix array AOS is shown in FIG. 1 herein and described in commonly assigned, co-pending U.S. patent application Ser. No. 566,530, the disclosure of which is incorporated herein by reference.

To properly collect dispensed products according to the shipping order, the central control computer virtually delineates the gathering conveyor belt into consecutive order zones separated by buffer zones (FIG. 1). The computer, according to the shipping order, then causes the proper products to be ejected from the cartridges onto the conveyor as the order zone assigned to the shipping order by the computer passes thereunder. As each order zone for a shipping order reaches the downstream end of the conveyor belt, the products in the zone are dumped into a shipping container (or tote) for further processing if necessary (for example, manual picking of additional products) and shipment to the customer.

Each product cartridge in an AOS further includes some sort of means for ejecting products from the cartridge onto the moving gathering belt. The combination of an ejector with a cartridge is commonly referred to as a dispenser. Two different means, one passive and the other active, are commonly included in prior art AOS dispensers to eject products onto the conveyor belt. The passive and active ejection systems for an AOS are typically distinguished from each other by the actions taken on the product by the ejection mechanism. An active system can usually be distinguished from a passive system in that active systems include means for forcibly ejecting the product from the dispenser cartridge.

For example, a passive gravity assist product release system is shown in FIGS. 5A and 5B of commonly assigned, co-pending U.S. patent application Ser. No. 566,530. This passive system includes a dispensing gate at the end of the product cartridge and a stop gate positioned within the cartridge at least one product length from the dispensing gate. The two gates are configured such that while one is closed the other is open, and vice versa, thereby allowing products in the cartridge to be singularly dispensed. When the dispenser gate opens, the bottom-most product in the stack is released. When the stop gate opens, the next product advances down the cartridge into position to be released the next time the dispense gate is opened. This passive system advantageously utilizes the force of gravity, rather than use a forcible ejector, to deposit the products released by the dispense gate onto the underlying conveyor.

An example of a prior art active lever eject system is shown in FIGS. 5-7 of U.S. Pat. No. 4,518,302, issued to Knapp. A lever is positioned for rotation about an axis such that one end of the lever is adjacent to the edge of the bottom-most product in the cartridge. An actuator, coupled to the lever, causes the lever to rotate about the axis forcing the end of the lever adjacent to the product to eject the product from the cartridge. This active system, as can be seen, differs from the passive system in the use of the lever as an ejector or kicker to apply force on the edge of the bottom product to eject the product from the dispensing cartridge onto the underlying conveyor.

Many prior art passive and active ejection systems and mechanisms share several shortcomings which render their continued use undesirable. For example, due to the configuration of the ejection system, the actuator (solenoid, hydraulic, pneumatic, etc.) and the associated mechanism tend to occupy a significant amount of space in the system, especially in the downstream conveyor direction. This adversely affects the ability to expand the capacity of the system when given a conveyor of limited, fixed length, as the space needed for additional product cartridges in the expanded system is occupied by the inefficiently designed actuators and mechanisms for the existing dispensers in the matrix.

An additional shortcoming experienced with prior art passive and active ejection systems is damage to the dispensed products as the products are ejected from the cartridge and impact with the underlying moving conveyor. In the passive system, the product free-falls in a vertical direction to land on the conveyor moving in a horizontal direction. In the active system, the products are often ejected in downward direction and typically opposite to the conveyor flow, or downward and laterally across the flow of the conveyor. The acute impact between the moving conveyor and product in both passive and active systems has proven to be a significant factor in dislodging products from their packaging and causing damage to products and their packaging.

Furthermore, the ejection systems of the prior art have proven to have built-in limitations in their ability to handle products of different sizes and shapes. Earlier passive systems utilize friction between a product and a dispenser stop gate to retain the product during release of the bottom-most product. Thus, flat or thin packages must be stacked lengthwise rather than flat in the dispenser as the thin edge of the package when stacked flat does not provide enough of a surface for the stop gate to hold the product in the cartridge. This reduces the number of products that may be placed within a cartridge necessitating frequent refilling thereof. Furthermore, if improperly stacked, a single actuation of the ejector may cause two or more products to be ejected.

Accordingly, there is a need for an improved means for ejecting products from a product cartridge onto a moving conveyor belt in an automated order system having a plurality of product dispensers. In order to maximize the number of dispensers that are positionable along the longitudinal length of the conveyor, the actuation mechanism and ejection mechanism (ejector) should be as longitudinally thin as possible in order to more closely stack adjacent dispensers in the matrix. Furthermore, the means should provide efficient and reliable dispensing with minimal resultant damage to either the product or package. Finally, the means should be adjustable to handle various sizes and shapes of products.

SUMMARY OF THE INVENTION

To address the limitations of the passive and active ejection systems of the prior art, the present invention provides an improved active ejector mechanism that may be used with various types, sizes and shapes of products and dispenser configurations. In accordance with the broader aspects of the active product ejector of the present invention, the ejector mechanism includes a pneumatically actuated flexible ejector belt disposed in a pair of substantially L-shaped guide tracks. A cartridge, designed for use with the ejector of the present invention, holds a product stack in position between the two guide tracks such that the center of the bottom-most product in the stack is coplanar with the base of the L-shaped guide tracks. Pneumatic actuation causes the ejector belt to move through the L-shaped tracks and eject the bottom-most product from the cartridge.

The active product ejection mechanism according to the present invention, unlike the prior art product ejection systems, either passive or active, is small and compact, thereby permitting adjacent dispensers (each dispenser comprised of a cartridge plus an ejector mechanism) to be more closely stacked in the dispenser matrix. With such an ejection system, more dispensers can be longitudinally positioned over a gathering conveyor belt of a fixed length thus increasing the capacity of the AOS. The actuation path of the ejector belt may be adjusted by adjusting the positioning of the bottom-most product within the cartridge. This enables the dispenser to handle various sized and shaped products. Furthermore, the cartridge and flexible ejector mechanism (dispenser) are oriented at a compound angle with respect to the conveyor belt to facilitate product resupply and minimize the likelihood of product damage resulting from ejection.

BRIEF DESCRIPTION OF THE DRAWINGS

A more complete understanding of the advantages of the flexible ejector mechanism and cartridge of the present invention may be had by reference to the following Detailed Description when taken in conjunction with the accompanying Drawings wherein:

FIG. 2A is a schematic top view of an automated order system according to the present invention where the dispensers are arranged in a matrix fashion and oriented at a compound angle with respect to the underlying conveyor belt;

FIGS. 2B and 2C are schematic lateral and longitudinal cross-sectional views, respectively, of FIG. 2A taken along lines 2B—2B and 2C—2C, showing the preferred compound angle orientation of the dispensers with respect to the conveyor belt according to the present invention;

FIG. 3A is a perspective view of the flexible ejector mechanism of the present invention;

FIG. 3B is a side view of the flexible belt and pneumatic actuator as disassembled from the L-shaped guide tracks of the flexible ejector mechanism shown in FIG. 3A;

FIG. 4A is a perspective view of a product cartridge for use with the flexible ejector of FIG. 3A;

FIG. 4B is a reverse side view of the product cartridge shown in FIG. 4A; and

DETAILED DESCRIPTION OF THE DRAWINGS

Figure 1:
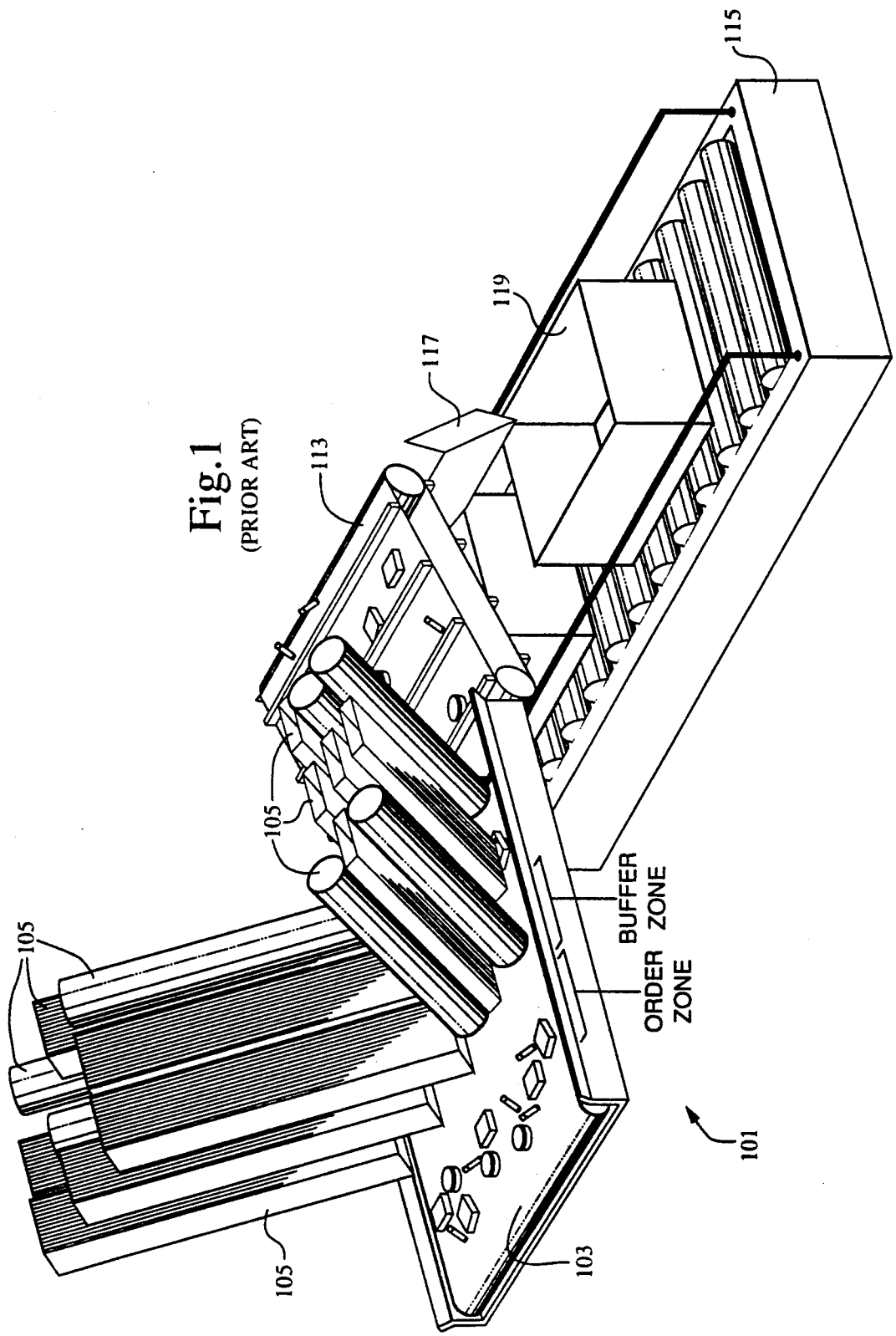
FIG. 1 is a perspective view of a prior art automated ordering system having a plurality of angled product dispensers arranged in a matrix fashion above a gathering conveyor belt.

Referring now to FIG. 1, there is shown a perspective view of a prior art automated ordering system (AOS) 101 showing the known dispenser matrix configuration and product output configuration. Suspended above a gathering conveyor belt 103 for the system 101 are a plurality of product dispensers 105 of different shapes and sizes containing products of correspondingly different types, sizes and shapes. Each dispenser 105 is comprised of a product cartridge (not shown) and an ejector mechanism (not shown). The individual dispensers 105 are similarly oriented with respect to each other and the conveyor 103, leaning at an angle of twenty-five degrees from vertical in an outward (lateral) conveyor direction. Laterally angling the dispensers 105 in this manner enhances the operation of the system 101 by facilitating manual product resupply of the dispensers.

The gathering conveyor belt 103 is separated into "order zones" representing one shipping order or a part of one shipping order and "buffer zones" separating adjacent order zones. The longitudinal size of an order zone is virtually delineated by the system control computer (not shown) according to the size of the whole or partial shipping order being filled by the system 101. In an AOS, the central control computer tracks the positions of the order zones in real time as each zone moves downstream with the movement of the gathering conveyor belt 103. As an order zone moves beneath a product dispenser 105 storing a product on an order, the computer causes the ejector mechanism (not shown) for the product dispenser to eject the correct number of products for the order into the order zone. The buffer zones between order zones minimize the possibility of accidentally mixing products from the adjacent order zones of separate shipping orders.

The terminating end of gathering conveyor belt 103 in an AOS delivers dispensed products in an order zone onto a transfer conveyor belt 113 which acts as a transition area between gathering conveyor belt 103 and an index conveyor 115. A slide 117 directs products from the transfer conveyor 113 into a tote 119 that is positioned beneath the slide 117 by the index conveyor 115. If some of the ordered products were are not included in the dispensed order, the additional products must be manually picked to complete the shipping order. When the order is completely filled, the tote 119 is directed to a shipping area for delivery to the customer.

Referring to FIG. 2A, there is shown a schematic top view of an AOS 200 according to the present invention where each individual dispenser including a cartridge 400 and ejector (not shown) in the matrix is oriented at a compound angle with respect to the underlying conveyor belt 201. This compound angle concept for the dispensers may be more clearly understood and visualized with respect to FIGS. 2B and 2C which show schematic lateral and longitudinal cross sectional views of the system 200 of FIG. 2A. First, as shown in FIG. 2B, the dispensers with cartridges 400 are laterally angled at a twenty-five degree angle with respect to vertical and away from the conveyor 201. Lateral angling in this manner facilitates resupply of the AOS 200 by human operators. Second, as shown in FIG. 2C, the dispensers 400 are longitudinally angled at a thirty degree angle with respect to vertical and in a downstream conveyor direction (see also FIGS. 5A and 5B).

Longitudinal angling in this manner serves to aim the ejector mechanisms (not shown in FIGS. 2B and 2C, shown in FIGS. 3A, 5A and 5B) and dispensers in a downstream direction. This facilitates efficient operation of the system in several significant ways. First, the longitudinal angle allows the ejector to dispense a product from the cartridge under the longitudinally adjacent cartridge in the dispenser matrix, thus saving rationable space along the conveyor. Second, the longitudinal angle allows products to be ejected with the flow of underlying conveyor 201. This minimizes the number of occasions of acute angle impacts between the ejected products (see FIG. 2C) and the conveyor 201 which impacts tend to cause damage to the product and its packaging. Furthermore, ejection of product with the flow of the conveyor minimized the likelihood that ejected products will stray from the designated order zone (FIG. 2A).

The use of a compound angle as in the present invention also presents several additional advantages. First, the use of a compound angle with an L-shaped cartridge 400 (see FIG. 4A) makes operation and reloading of the dispenser easier as the compound angle and L-shape presents a "trough" in the dispenser that effectively maintains alignment of the product stack. This trough makes reloading of the dispenser easier as the human operator need only place the product in trough with gravity acting to align the products therein. Prior art U-shaped, upright cartridges were difficult to load because there were two side edges upon which a loaded product could rest. Reference is now made to FIG. 3A wherein there is shown a perspective view of a flexible ejector mechanism 300 that occupies substantially less longitudinal space in an AOS than prior art ejector systems. With the flexible ejector 300, adjacent dispensers in an AOS matrix can be more closely stacked to allow for the inclusion of more dispensers on the AOS without increasing the length of the AOS gathering conveyor. This increase in capacity obtained without a corresponding increase in conveyor length, allows for a greater variety of products to be included in, and picked by the AOS. With increased product capacity and variety manual picking of other products is less likely to be needed.

According to the teachings of the present invention, the flexible ejector mechanism 300 includes a pneumatically actuated flexible ejector belt 301 disposed in an opposed pair of substantially "L"-shaped guide tracks, 303L (Left) and 303R (Right). Each "L"-shaped guide track 303 includes an upper guide 305 and lower guide 307 parallel to each other and separated by a distance wide enough to allow the belt 301 to freely move therein. The L-shape of the guide tracks 303 serves to efficiently guide and translate vertical motion of the flexible belt 301 into horizontal motion for ejecting products from a product cartridge in an manner to be described.

Each upper guide 305 is unitarily comprised of a vertical arm 305a and a horizontal arm 305b joined by a diagonal interconnect member 305c. Each lower guide 307 is unitarily comprised of a vertical arm 307a and horizontal arm 307b joined by a curved interconnect member 307c. The upper and lower guides, 305 and 307, respectively, are preferably manufactured from a slightly flexible metal or metal alloy such as aluminum. The guides 305 and 307 are shown as having a substantially rectangular cross section, however, it will be understood that such is not required.

Vertical arm 307a of the lower guide for each guide track 303 is mounted, through welding or other suitable means, to an ejector mounting plate 309. At one end 311 of the L-shaped guide track 303, a spacer 313 is welded or otherwise secured between the horizontal arms 305b and 307b of the upper and lower guides to maintain sufficient separation therebetween allowing for movement therein of the ejector belt 301. It will of course be understood that the upper and lower guides 305 and 307 can be unitarily formed thus obviating the need for a spacer 313. Vertical arm 305a of the upper guide is separated from, and detachably secured to, vertical arm 307a and mounting plate 309 by means of a spacer (not shown) and nut 315. When the nut 315 is removed, the upper guide 305 can be flexibly moved away from lower guide 307, allowing the belt 301 to be removed from the guide track 303 for service or replacement.

Three rollers 317 positioned at the bend in the "L"-shaped guide track 303 defined by the diagonal interconnect member 305c and curved interconnect member 307c, are arranged in a triangular configuration to assist in translating vertical motion of the ejector belt 301 to horizontal motion by causing the belt to bend to conform to the L-shape of the guide tracks 303. The first roller 317a and second roller 317b are rotatably mounted to vertical and horizontal arms, 307a and 307b, respectively, each extending between the left and right guide tracks 303L and 303R. The third roller 317c is rotatably mounted to diagonal interconnect member 305c, again extending between the left and right guide tracks 303L and 303R. When the flexible belt 301 is disposed within the guide tracks 303, the belt passes over the first and second rollers, 317a and 317b, and below the third roller 317c. The rollers 317 function to reduce friction at the bend in the L-shaped guide tracks 303, as well as direct the translational movement of the belt from vertical to horizontal.

Referring now to FIGS. 3A and 3B, the ejector belt 301 is a substantially rectangular, flat, flexible member preferably formed from plastic or other suitable flexible material. At an actuation end 319 of the belt 301, an actuator mounting block 321 is mounted to the upper belt surface. At the impact end 323 of the belt 301, an impact block 325 is mounted to the lower belt surface (as shown). Mounting of an impact block 325 on the upper surface is not preferred as the block 325 would interfere with the product stack following an actuation of the ejector belt 301. Coupled to the actuator mounting block 321 is an actuation arm 327 coupled to a bi-directional pneumatic actuator 329.

Reference is again made to FIG. 3A showing actuation process for the ejector 300. The pneumatic actuator 329 is detachably mounted to the mounting plate 309 by means of a pin 331. In its rest state, the belt 301 of the ejector 300 is substantially vertically oriented adjacent to the mounting plate 309 although a portion of the belt at the impact end 323 is bent by the rollers 317 in the horizontal direction. Through arm 327, the pneumatic actuator pushes downwardly against the block 321 causing the belt 301 to move from its rest state in a vertical direction downward within the guide tracks 303. As the belt 301 is forced by the arm 327 through the bend in the L-shaped guide tracks 303, the set of triangularly arranged rollers 317 bends the belt 301 to conform to the L-shape, translating vertical motion instigated by the pneumatic actuator 329 to horizontal motion for use in ejecting products from a cartridge. Thereafter, reversal of the pneumatic actuation force will return the belt 301 to its rest position.

Referring now to FIGS. 4A and 4B, there is shown a perspective and reverse side view, respectively, of a product cartridge 400 for use with the flexible ejector mechanism 300 (FIG. 3A) to form a dispenser. The cartridge 400 has a substantially L-shaped cross section and is comprised of a base wall 401 and a side wall 403 manufactured of hard, lightweight plastic or other suitable material. At the top of base wall 401 is a hand hold 405 for human operators to carry the dispenser 400 or remove the dispenser when installed in an AOS 200 (FIG. 2A). With the cartridge 400 as shown, remote reload of products can be easily effectuated without interfering with the operation of the AOS 200.

At the bottom of the base wall 401, a product shelf 407 upon which the stack of products rest is adjustably mounted to the dispenser 400. The adjustable shelf 407 is provided to enable the flexible ejector 300 (FIG. 3A) to operate with a variety of product sizes and shapes and is detachably mounted to the dispenser 400 through bar 406 (FIG. 4B, only). Use of an adjustable cartridge 400 provides enhanced operation over prior art systems in that no adjustment need be made to the ejector mechanism 300 (FIG. 3A) in order to handle products of various sizes and shapes. Reconfiguration of the AOS 200 can thus be easily performed through external adjustment to the included cartridges rather than adjustment of the ejector mechanism.

The side wall 403 is mounted perpendicularly to the base wall 401 at an edge thereof to form a crease 408 within which the stack of products rests when the dispenser 400 is properly oriented at a compound angle for product ejection (see FIG. 2A). The side wall 403 terminates prior to the end of the base wall 401 to define a slot opening 409 (see also FIG. 2B) with respect to the shelf 407 through which ejected products may pass. With this configuration, the lower end 411 of the side wall 403 serves as a rigid front stop 413 which prevents additional products other than the bottom-most product in the product stack from being ejected.

Mounted to the side wall 403 adjacent to the rigid front stop 413 is a flexible, adjustable plastic front stop 414 covering the slot opening 409. The flexible front stop 414 is adjustable in terms of the amount of the slot opening covered thereby by means of a slot 415 in the stop 414 and a set screw 417 (see also FIG. 2B). When covering the opening 409, the flexible front stop 414 prevents the bottom-most product from sliding out of the cartridge 400 or being inadvertently ejected therefrom. The cartridge 400 further includes an adjustable back stop 419 mounted to the base wall 401 at the end of the cartridge adjacent to the adjustable product shelf 407 to inhibit rearward movement of the product next above the bottom-most product as a result of the ejection process and the return of the ejector to its rest position as will be described.

Figure 5A:
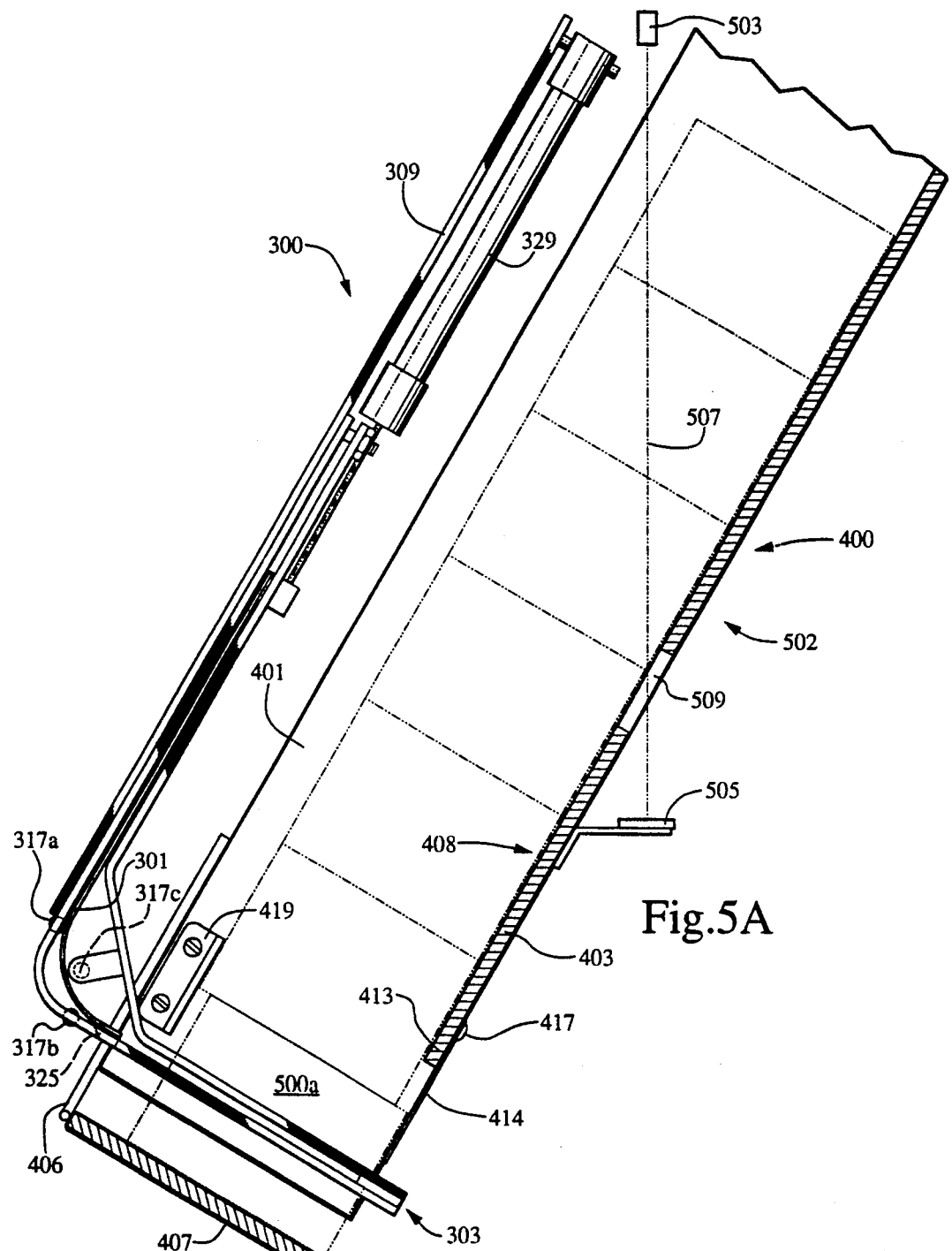
FIGS. 5A and 5B show side views of the flexible ejector mechanism of FIG. 3A and cartridge of FIG. 4A during the product ejection process.
Figure 5B:
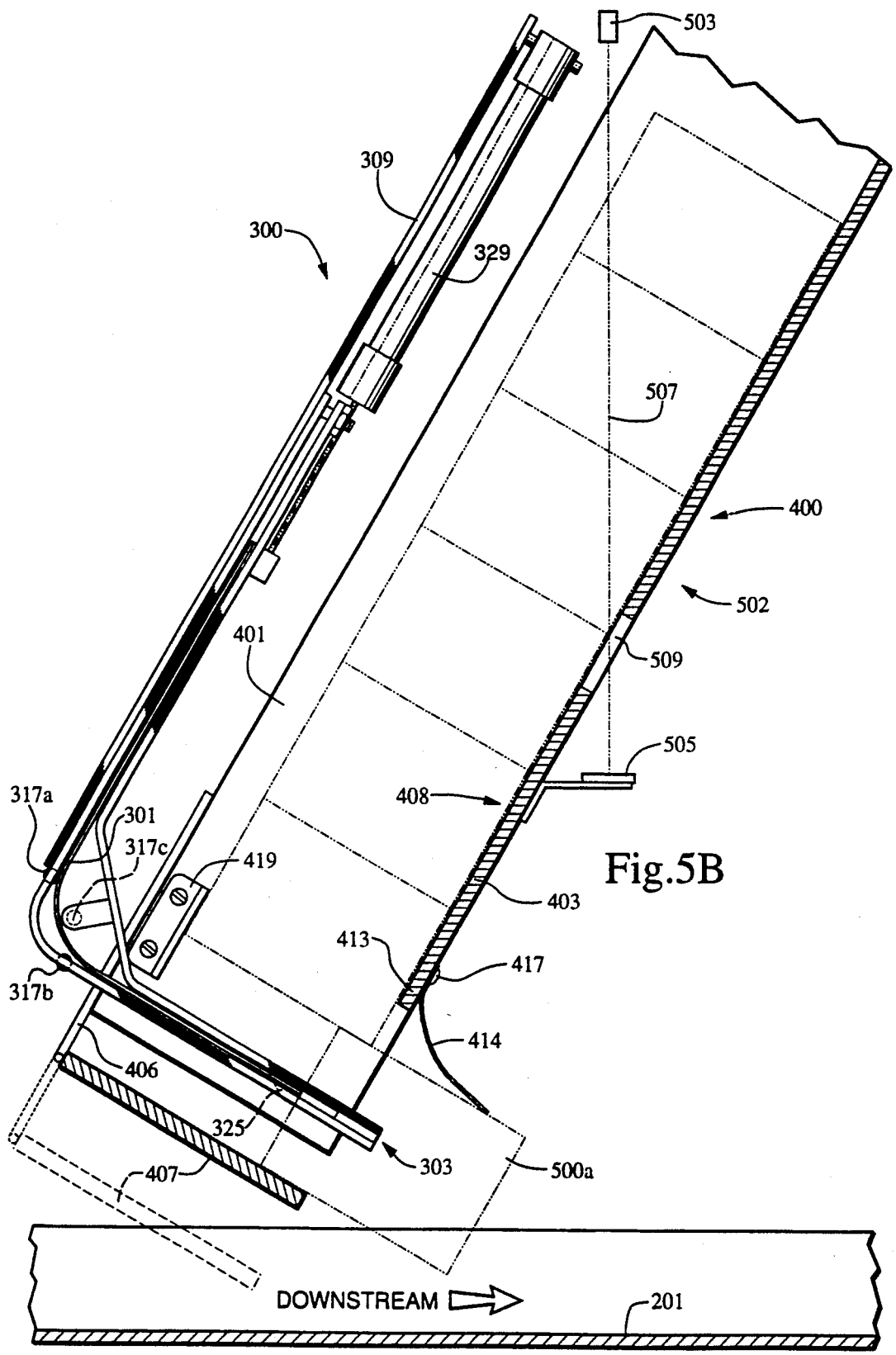

Reference is now made to FIGS. 4A, 5A and 5B for a description of the ejection process utilizing the flexible ejector mechanism 300 (FIG. 3A) of the present invention. As can be seen in FIGS. 5A and 5B, the cartridge 400 of FIG. 4 is oriented between the pair of L-shaped tracks 303 and the product shelf 407 is adjusted such that the L-shaped tracks, and hence the path of the belt 301 during the ejection process, are positioned substantially along the center line of the bottom-most product 500a. With such an orientation, the ejector 301 belt can be positioned to strike the bottom-most product 500a in a most efficient fashion at its approximate center of gravity.

In the preferred embodiment, the products in the cartridge 400 are oriented such that the belt 301 will strike the edge of the product along its longest dimension. Orientation and ejection of the products in this manner provides several benefits. First, the longest dimension of the products is most always not the end of the product. Thus, striking the product will not cause the product to be dislodged from its packaging as the package end opens with the force of impact. Furthermore, by ejecting across the longest dimension, the impact force is distributed over a wider area thus minimizing the chance of product damage.

As the ejector 300 and the dispenser 400 are angled with respect to the vertical as shown (see also FIGS. 2A, 2B and 2C), the stack of products 500 advantageously rests in the crease 408 of the cartridge and the rigid and flexible front stops, 413 and 414 respectively, serve to prevent the individual products of the product stack from falling out of the dispenser. When the pneumatic actuator is energized, the belt 301 moves from its rest position adjacent to the mounting support 30 around the bend in the L-shaped guide tracks 303 to strike the edge of the bottom-most product 500a and eject the product from the cartridge 400. As the product 500a is ejected, the flexible front stop 414 bends to allow the product to pass and be expelled in a downstream direction onto the underlying moving conveyor 201. Downstream ejection minimizes the chance product damage by reducing the likelihood of acute impact with the conveyor 200. This type of ejection also reduces the likelihood that dispensed products will roll on the conveyor 201 surface and stray from their intended order zone. When the belt 301 returns to its rest position following ejection of the bottom-most product 500a, the belt may catch, through friction with the product surface or contact with the impact block 325, for example, the next product 500b. Back stop 419 prevents the next product 500b, if caught by the belt 301, from moving in a rearward direction as the belt retracts and thus maintains proper stacking of products within the dispenser 400. The backstop 419 is mounted to the base wall 401 by means of screws and can be adjusted in position to accommodate products of varying sizes and shapes.

Also shown in FIGS. 5A and 5B is a low product detector 502 comprised of a photoelectric switch 503 and a reflective mirror 505. The photoelectric switch 503 directs an infrared light beam 507 at the mirror 505 through a slot 509 cut in the side wall 403 of the cartridge 400. If the light beam 507 passes through the slot 509, it is reflected by the mirror 505 and detected by the photoelectric switch 503. A signal is then output indicating that the cartridge 400 is low on products. This signal alerts the human operator of the system 200 to refill or replace the cartridge 400 and also conditions the central control computer (not shown) to shut down a particular dispenser after the ejection of a preselected number of products. However, if the cartridge 400 is full such that a product covers the slot 509, the light beam is prevented from reflecting off the mirror 505 and returning to the photoelectric switch 503. The switch 503 will thus output a signal to the human operator that the dispenser 400 contains sufficient products and that no refill is needed at that time.

The invention has been described in connection with a preferred embodiment. This description is not intended to limit the scope of the invention to the particular form set forth. On the contrary, it is intended to cover such alternatives, modifications, and equivalences as may be included within the spirit and scope of the invention as defined in the appended claims.

I claim:

1. A flexible ejector mechanism, comprising:
   a first substantially L-shaped guide track mounted to a substantially vertical support plate;
   a second substantially L-shaped guide track mounted to the substantially vertical support plate a spaced distance apart from the first guide track;
   a flexible ejector belt disposed between and freely moveable along the L-shaped guide tracks, the belt having a first unactuated vertical position adjacent the support plate; and
   actuation means mounted to the ejector belt for causing the belt to move around a bend in the L-shaped guide tracks to a second, actuated horizontal position to eject a bottom-most product from a product cartridge received in an opening defined between the spaced apart first and second guide tracks.

2. The flexible ejector mechanism as in claim 1 further including a set of rollers positioned at the bend of the L-shaped guide tracks and extending between the first and second guide tracks to translate the belt around the bend between the vertical and horizontal positions.

3. The flexible ejector mechanism as in claim 1 wherein the flexible ejector belt includes an actuation end including means for connecting the actuation means to the ejector belt, the ejector belt further including an impact end and an impact block mounted to the ejector belt at the impact end for striking the bottom-most product in the received product cartridge.

4. The flexible ejector mechanism as in claim 1 wherein the flexible ejector belt includes opposed side edges, the spaced apart first and second guide tracks retaining the side edges of the belt.

5. A dispenser mechanism, comprising:
   a flexible ejector belt having first and second side edges;
   a first guide track for retaining and guiding the first side edge of the flexible ejector belt during movement thereof;
   a second guide track for retaining and guiding the second side edge of the flexible ejector belt during movement thereof;
   means for mounting the first and second guide tracks a spaced distance apart from each other, the spaced guide tracks defining an opening therebetween for receiving a removable product cartridge; and
   actuation means for causing the flexible ejector belt to move along the guide tracks between an unactuated position and an actuated position, the ejector extending into the opening when in the actuated position to eject a bottom-most product from a stack of products retained in the received product cartridge.

6. The dispenser mechanism as in claim 5 wherein each of the first and second guide tracks comprises a guide having a first member for guiding the ejector in the unactuated position and having a second member for guiding the ejector in the actuated position.

7. The dispenser mechanism as in claim 6 wherein the first and second members are positioned to define a bend, the mechanism further including a set of rollers rotatably mounted at the bend and extending between the first and second guide tracks to assist in bending the ejector during movement along the guide tracks between the unactuated position and the actuated position.

8. A dispenser mechanism, comprising:
   a first guide track having a bend;
   a second guide track having a bend;
   means for mounting the first and second guide tracks a spaced distance apart from each other defining an opening between the first and second guide tracks for receiving a removable product cartridge;
   a flexible ejector belt disposed between and freely moveable along the guide tracks;
   roller means rotatably mounted at the bend of each guide track to extend between the first and second guide tracks for directing movement of the ejector belt around the bend; and actuation means for causing the ejector belt to move along the guide tracks between an unactuated position and an actuated position, the ejector belt extending into the opening when in the actuated position to eject a bottom-most product from a stack of products stored within the received product cartridge.

* * * * *